April 22, 1941.    O. A. ROSS    2,238,947
SOUND RECORDING SYSTEM
Filed July 15, 1937
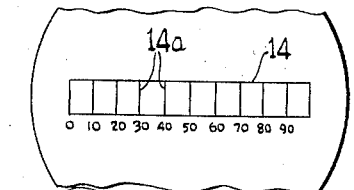
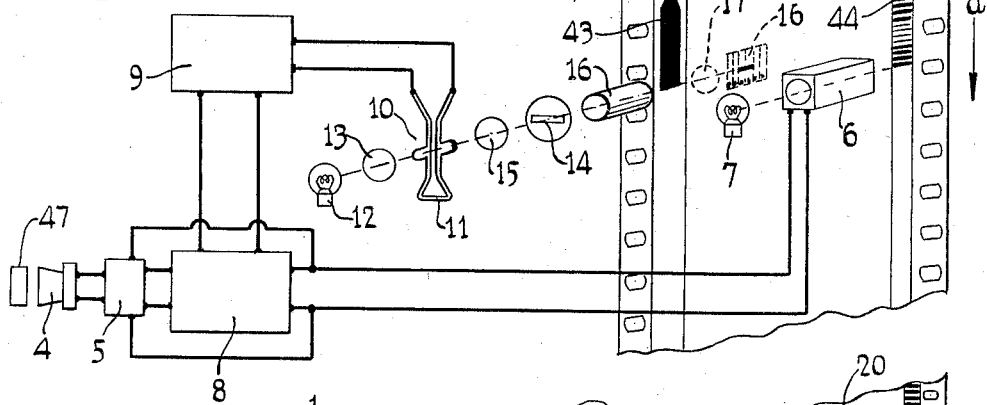
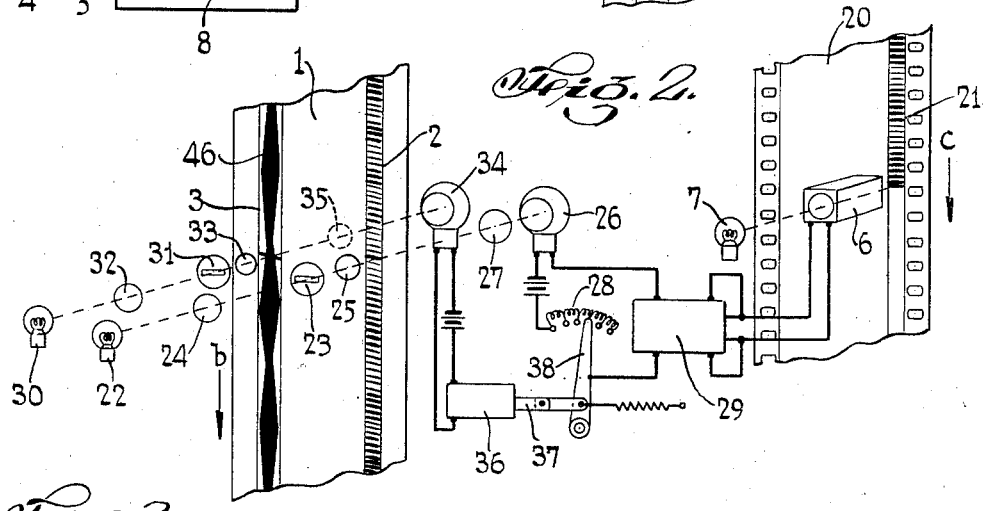
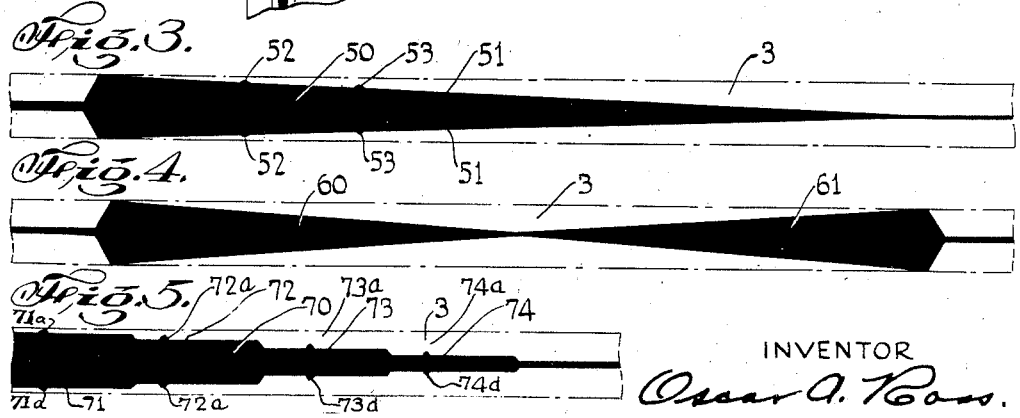
INVENTOR
Oscar A. Ross.

Patented Apr. 22, 1941

2,238,947

UNITED STATES PATENT OFFICE 2,238,947

SOUND RECORDING SYSTEM

Oscar A. Ross, New York, N. Y.

Application July 15, 1937, Serial No. 153,773

8 Claims. (Cl. 179—100.3)

This application forms a continuation in part application of my co-pending application Serial No. 331,793, now Patent No. 2,147,499, issued Feb. 14, 1939, and refers more particularly to recording parallel sound and sound amplitude or check records onto films for the purpose of checking the integrity of the recording apparatus as well as producing records indicating the amplitude of recorded sound by said apparatus.

In photographically recording sound waves onto light sensitive film, there may be as many as fourteen energy transitions due to the various instrumentalities employed during said recording, and therefore the failure of any one or more of said instrumentalities, however slight, will impair the faithfulness thereof. It is therefore essential that all said instrumentalities should be maintained at a high degree of performance, and for which reason, said instrumentalities should be regularly, or preferably, constantly checked as to said performance.

It is also preferable that said tests should be made without disrupting the circuits wherewithin the instrumentalities are included, and that said tests should be made with a minimum addition of foreign instrumentalities in connection therewith.

All the foregoing is accomplished with this invention wherein a photographic record of the performance of recording apparatus is made on film together with simultaneously visually indicating said performance during the recording thereof. The performance or check record is recorded parallel to a sound wave record of the sound produced during normal sound recording or during the production of sound for making said performance or check test thereby permitting said sound wave records to be reproduced for audibly re-checking against the test sound. Assuming the capacity of a sound recording system to be tested approximates 100 db., a sound producing instrument capable of projecting a constant frequency signal which may be uniformly increased or decreased between zero and 100 db. is placed before the microphone and operated between these levels. Assuming the integrity of the apparatus to be normal, substantially straight line records will be recorded on the film as will be more fully hereinafter pointed out.

The invention further comprehends utilizing the aforesaid performance, amplitude or check records for the purpose of re-recording pre-recorded sound wherein the level at portions thereof may be too high or too low, the re-recording operation reducing the level of the abnormally high record portion and raising the level of the abnormally low portion, the apparatus for accomplishing this feature being automatic in operation.

Other advantages will appear as the description of the invention progresses and the novel and peculiar features of the apparatus are pointed out, and wherein—

Figure 1 is a diagrammatic view of one embodiment of the invention including circuits thereof. Fig. 2 is another diagrammatic view of another embodiment of said invention. Figs. 3, 4 and 5 are enlarged plan views of performance or check records produced in making check tests by the apparatus shown in Fig. 1. Fig. 6 is a part plan view of an enlarged light slit member.

Referring to Fig. 1, light sensitive film 1, shown of enlarged width for clearer understanding, is assumed to be uniformly advanced in direction of arrow $a$ and includes sound track 2 and performance, check or amplitude track 3. Sound directed into microphone 4, is converted into modulated energy by amplifier unit 5, the output of which is connected to light valve unit 6, for modulating light projected by light source 7 in accord with the frequency of said sound, said amplifier unit 5 also being connected to wave dampening unit 8, the output of which is also connected to light valve unit 6 for also biasing the same to permit a maximum amount of light from said light source to said film at minimum amplitude of said sound, and a minimum amount of said light at maximum amplitude thereof as disclosed more fully in my co-pending application Serial No. 130,011, filed March 10, 1937, wherein the negative form sound record is utilized for sound reproduction. If desired the biasing may be reversed and the sound track 2 pre-fogged beyond the toe of the H and D curve corresponding to the exposure curve of film 1, as disclosed in my Patent No. 2,074,516 dated March 23, 1937, for the purpose of more faithful recording of said sound.

Also connected to the output of wave dampening unit 8, is amplifier 9, the output of which is connected to ribbon light valve unit 10 having light controlling ribbon member 11, the parallel portions of which are arranged longitudinally with respect to check track 3. Light from light source 12 is focused onto said ribbon member 11 by objective 13, and the light passing said member is focused onto light slit 14 by objective 15, the light passing said slit being focused on track 3 by objective 16. Light valve unit 10 is more fully described in my co-pending application Serial No. 75,515 filed April 21, 1936. The portion of light passing through track 3 is optically projected onto screen 16 by objective 17 for visual observation, said screen being provided with scales for determining the length of the attenuated image projected on track 3, said scale being preferably designated in decibels herein termed db.

Referring to Fig. 2, developed film 1 and light sensitive film 20 are assumed to be uniformly advanced, film 20 having sound track 21. Light from light source 22 is focused onto light slit 23 by objective 24, the light passing said slit being focused onto sound track 2 by objective 25, the light leaving said film being focused onto light sensitive cell 26 by objective 27. The output of said cell is connected through an energized circuit including potentiometer 28 to the input of amplifier and wave dampening unit 29, the output of which is connected to biased light valve unit 6 and arranged to bias the light valve thereof in accordance with the amplitude of the modulated energy from unit 29 as well as vibrate said light valve in response to the frequency of said energy modulation, said light valve unit 6 being arranged to record a record of sound onto sound track 21 as said film 20 advances.

Light source 30 is focused onto light slit 31 by objective 32, the light from said slit being focused onto check or amplitude recording track 3 by objective 33, the light escaping the opaque record 46 on said track and passing through said film being focused onto light sensitive cell 34 by objective 35. The output of said cell 34 is connected in an energized circuit arranged to operate solenoid or magnetic device 36, the armature or movable element 37 of which is arranged to actuate arm 38 over potentiometer 28 and control the amplitude of the modulated energy flowing to the input of amplifier and wave dampening unit 29.

Figs. 3, 4 and 5, are enlarged check records assumed to have been removed from track 3 for a clearer showing.

*Operation*

Referring to Fig. 1, sound directed into microphone 4 is recorded by biased light valve unit 6 onto sound track 2, being shown as recorded in variable density form although the record may be of the variable area form upon light valve substitution.

Simultaneously with recording said sound record, the parallel portions of light valve ribbon member 11 are moved to vary the opening therebetween in accord with the amplitude of said sound, the light valve unit 10 being adjusted to pass a minimum amount of light between said ribbons during minimum or nil amplitude of said sound, and a maximum amount of said light during maximum amplitude thereof. At minimum separation of said ribbons, the comparatively small amount of light passing there-between will record a comparatively fine line as 40, indicating that no sound of recordable proportions has been recorded on the corresponding sound track portion 41 of sound track 2, whereas at maximum amplitude of said sound, said ribbons will be separated sufficiently whereby the attenuated light image will extend transversely between the margins of track 3, the light slit 14 being illuminated throughout the entire width thereof and therefore said track 3 will be exposed between the margins thereof resulting in a totally opaque area between said margins. As shown in Fig. 1, the sound being recorded is assumed to be at a level of substantially 60 db. and therefore approximately 60 percent of the area between said track margins is being exposed, the light valve 6 also being assumed to be recording at a level of 60 db., but having a capacity of 100 db. The exposed portion 43 on amplitude or check track 3 is assumed to indicate recording at a level of 60 db. of the sound record portion 44 on sound track 2.

When recording sound corresponding to speech or incidental noises, the amplitude record will appear more nearly to that shown on amplitude track 3 of that portion of film 1 shown in Fig. 2. From the foregoing it will be seen that while recording a sound wave record of sound onto sound track 2 a corresponding amplitude record of said sound is also being photographically recorded onto amplitude or check track 3 in synchronous relation therewith, said records being preferably recorded transversely opposite each other for more ready comparison after film 1 has been developed.

Also simultaneously with photographically recording said amplitude or check record on track 3, the portion of light passing through said track is optically projected onto screen 16 by objective 17, said projected light image being preferably of enlarged form as compared to the image projected onto said track. Said screen is also preferably comparatively large and is provided with a suitable index scale having lines traversing said image for definitely indicating the length thereof, said scale lines being preferably indicated in decibels for indicating the level of the sound being recorded. If desired light slit 14 may have fine wires or masks as 14a extending transversely thereof as shown by Fig. 6, for recording fine spaced hair lines on said amplitude or check track 3, said spacing being preferably in steps of 10 db., where the recording range of the apparatus approximates zero to 100 db. When employing a light slit member shown in Fig. 6, the screen 16 may have the scale lines omitted.

Referring to Fig. 2, light source 22, objectives 24 and 25 and light slit 23 form part of a suitable sound head for projecting an attenuated light image onto sound track 2, said light being modulated in accord with the sound waves recorded on said track upon passing therethrough, said modulated light being optically projected onto light sensitive cell 26 for modulating the energy of the circuit in which said cell is included in accordance with said modulated light, said modulated energy, through amplifier and wave dampening unit 29, acting to energize light valve 6 for recording the sound record on film 1 onto the sound track 21 of film 20 subject to amplitude modification thereof as will be now described.

Light source 30, objectives 32 and 33 and light slit 31 form part of a second sound head for projecting an attenuated light image transversely of amplitude or check track 3, the end portions of said image not masked by the opaque amplitude record 46, being optically projecting onto light sensitive cell 34 for varying the energy supplied to magnetic device 36 in proportion to the amount of light projected onto said cell 34.

Since the narrower portions of amplitude record 46 denote the lower levels of sound recording, a comparatively larger amount of light will be projected onto light cell 34 and therefore the energy to magnetic device 36 will be increased thereby moving arm 38 to the left cutting out resistance in potentiometer 28 thereby increasing the amplitude of the modulated energy supplied to light valve 6, and upon reducing the amount of light projected onto cell 34 said arm will move to the right thereby decreasing said amplitude.

By this novel and peculiar manner of leveling sound amplitude, and assuming the desired recording level to be 60 db., a sound record portion initially recorded at an abnormal level of 100 db. may be re-recorded to a level of substantially 60 db. and another portion of said sound record initially recorded at 40 db. may be re-recorded as substantially 60 db. It is not necessary that all initially mal-recorded sound levels be re-recorded to a single level, for example by adjustment of the apparatus, a 40 db. level may be raised to approximately 50 db. during re-recording and a 100 db. level may be reduced to approximately 70 db. wherein such recording is required for better balance of sound reproduction, the object being to raise the abnormally low and decrease the abnormally high amplitude of initially recorded sound records during the re-recording thereof.

In addition to simultaneously recording amplitude and sound wave records of sound produced during the recording of sound motion pictures, the apparatus of Fig. 1 may be also employed for checking the various instrumentalities included in a sound recording hook-up, for example, a device 47 placed before microphone 4, is assumed to produce sound of a constant frequency and during said production uniformly increasing or decreasing the level thereof between zero and 100 db. in a given period of time. Assuming said device to initially produce said constant frequency signal at a level of 100 db. and then uniformly reduce said level to zero db. while film 1 advances, a check record as 50, Fig. 3, will be recorded on track 3. If the margins 51 of said record are straight it may be assumed the apparatus under test will affect straight line recording of sound, whereas if curved in part or wholly the levels corresponding to said curve portions will not be faithfully recorded that is, not recorded as straight line recording and said curve portions will indicate the levels wherein correction and/or adjustment of the recording apparatus must be made before straight line recording will obtain. Nodes, as 52 and 53 may appear indicating resonant peaks of one or more of the moving elements in the instrumentalities employed in the recording hook-up, the causes of which can be determined, and the details of which need not be herein further discussed.

Again assuming the sound level of checking device 47 be initiated at 100 db., uniformly decreased to zero db. and thereafter again uniformly increased to 100 db., the resulting checking record photographically recorded onto track 3 will appear substantially as records 60—61 shown in Fig. 4.

If desired checking device 47 may be supplanted by a similar device wherein the frequency of the signal varies uniformly from 20 to 10,000 cycles in a given period of time but is maintained at substantially constant amplitude at all frequencies, and that said frequency check tests are being made at 4 pre-determined amplitude levels each decreased in equal steps, a check record 70 will be recorded on track 3, the portion 71 being assumed to indicate a level of 80 db., 72 a level of 60 db., 73 a level of 40 db., and 74 a level of 20 db., and the frequency at which nodes as 71a—74a appear may be determined by measurement along said portions 71—74. It is to be understood that the check record as 50, 60 and 70 are shown comparatively shortened longitudinally on the track, especially check record 70 of Fig. 5 to be within the confines of the drawing. The frequency test track portion as 71—74 are preferably made of a pre-determined length and matched to transparent charts including scale lines indicating the particular frequency at any point along said record portion. In this manner it is only necessary to superimpose said transparent chart over a record portion as 71 to 74 to determine the exact frequency at which nodes or other discrepancies of the recording apparatus appear on said records.

Whereas the light valve unit 10 has been shown to pass a minimum of light to track 3 at minimum or nil sound production, said light valve may be arranged to effect maximum separation of the ribbon member 11 and thereby admit a maximum of light or, maximum length attenuated image at said track and under which conditions arm 38 of potentiometer 28 would be arranged to increase the amount of resistance inserted when moved to the left and decrease said resistance when moved to the right.

Whereas the light projected through film 1 on the amplitude or check track 3 is shown as being optically projected onto screen 16, said projected light may be directed onto a light sensitive cell included in an energized circuit having a suitable indicating or recording instrument responsive to said circuit. Or if desired said projected light beam may be split by a suitable prism, one portion of said split beam being directed onto said screen and the other portion being directed onto said light cell. By this latter manner of indicating the amplitude of the sound being recorded, an indication may be given at the recording instrument and another indication may be given at the sound source which may be remote from the point at which the sound is being recorded.

It is to be understood that films 1 and 20 are advanced in the direction of arrows b and c synchronously by a suitable apparatus arranged to advance said films uniformly.

It is also to be understood that the film 1 of Fig. 1 is advanced uniformly by suitable apparatus which may include developing and drying apparatus therefore forming part of the apparatus for advancing films 1 and 20 of Fig. 2 whereby the film 20 may be produced simultaneously with recording the sound wave and sound amplitude records onto film 1 of Fig. 1.

The system above illustrated and described should be construed merely as typical and not limiting the invention, the scope of which is defined in the appending claims.

What I claim is:

1. The method of recording sound which involves, recording a sound wave record corresponding to variations of both frequency and amplitude of sound onto a uniformly advanced record member, simultaneously recording a sound amplitude record corresponding to amplitude variations of said sound onto said record member independently of said sound wave record, utilizing said sound wave record for re-recording a second sound wave record thereof onto another record member advanced synchronously with said named record member, and utilizing said sound amplitude record for arbitrarily varying the amplitude of said re-recorded sound wave record with respect to the sound amplitude of said first named sound wave record.

2. The method of recording sound which involves, simultaneously recording independent sound wave and sound amplitude records corresponding to sound of varying amplitude onto a uniformly advanced record member, utilizing said sound wave record for re-recording a second sound wave record of said sound onto another record member advanced synchronously with said first named record member, and utilizing said sound amplitude record for arbitrarily varying the amplitude of said re-recorded sound wave record with respect to the sound amplitude of said first named sound wave record.

3. The method of recording sound which involves, photographically recording a sound wave record corresponding to variations in both frequency and amplitude of sound onto uniformly advanced light sensitive film, simultaneously photographically recording an amplitude record corresponding to amplitude variations of said sound onto said film parallel to said sound wave record, utilizing said sound wave record to photographically re-record a second sound wave record thereof onto another light sensitive film advanced synchronously with said first named film, and utilizing said sound amplitude record for arbitrarily varying the amplitude of said re-recorded sound wave record with respect to the amplitude of said first named sound wave record during said re-recording operation.

4. The method of recording sound wherein a developed film includes independent sound wave and sound amplitude records which involve, advancing said developed film and a light sensitive film synchronously, utilizing said sound wave record of said developed film for re-recording another sound wave record thereof onto said light sensitive film, and utilizing said amplitude record for arbitrarily controlling the amplitude of said re-recorded sound wave record during the re-recording thereof.

5. In sound recording apparatus, a developed film having sound wave and sound amplitude records thereon, a light sensitive film, means for advancing said films synchronously, a plurality of light sensitive cells, means for optically projecting light through said sound wave record onto one of said light cells, means responsive to said light cell for photographically re-recording said sound wave record onto said light sensitive film as they advance, means for optically projecting light through said sound amplitude records onto another of said light cells, and means responsive to said last named light cell for arbitrarily controlling the amplitude of said re-recorded sound in accordance with the variations in said sound amplitude record.

6. In sound recording apparatus, a light sensitive film, means for advancing said film uniformly, means for optically projecting light onto said film, means including a light valve modulated solely in accord with variations in amplitude of sound for photographically recording a linear amplitude indicating record of said sound onto said film, said record being uniformly opaque to light throughout the length thereof, said record having both margins thereof varied solely in accord with variations in amplitude of said sound.

7. In apparatus for synchronizing sound and picture records, a light sensitive film, means for advancing said film uniformly, means for producing modulated energy in response to both amplitude and frequency of sound, means including a ribbon light valve responsive to said modulated energy for recording a frequency sound wave record of varying amplitude onto said film as it advances, the recording portion of said ribbons extending transversely of said film with respect to the travel thereof, and means including a second ribbon light valve responsive solely to the amplitude of said modulated energy for recording a sound amplitude record onto said film parallel to said frequency wave record, the recording portion of said last named light valve extending longitudinally with respect to the travel of said film.

8. In apparatus for synchronizing sound and picture records, a light sensitive film, means for advancing said film continuously in one direction, a ribbon light valve including a light source for photographically recording a sound wave record corresponding to both the frequency and amplitude of sound onto said film in response to energy modulated in accord with said sound, the recording portion of said ribbons extending transversely of said film with respect to the advancement thereof, and a second light valve including a light source responsive solely to the amplitude of said modulated energy for recording a sound volume indicating record of varying width onto said film parallel to but spaced from said sound wave record, the recording portion of the ribbons of said last named light valve extending longitudinally of said film with respect to the advancement thereof.

OSCAR A. ROSS.